(12) United States Patent
Kurmlavage

(10) Patent No.: US 11,276,334 B2
(45) Date of Patent: Mar. 15, 2022

(54) ROLLING INFORMATION DISPLAY APPARATUS INCLUDING A TEMPERATURE MONITOR AND INDICATOR

(71) Applicant: Spirit Specialty Solutions, Inc., Broomall, PA (US)

(72) Inventor: Michael M Kurmlavage, Monroeville, NJ (US)

(73) Assignee: Spirit Specialty Solutions, Inc., Broomall, PA (US)

(*) Notice: Subject to any disclaimer, the term of this patent is extended or adjusted under 35 U.S.C. 154(b) by 0 days.

(21) Appl. No.: 17/073,139

(22) Filed: Oct. 16, 2020

(65) Prior Publication Data
US 2021/0118338 A1    Apr. 22, 2021

Related U.S. Application Data

(60) Provisional application No. 62/915,994, filed on Oct. 16, 2019.

(51) Int. Cl.
| | | |
|---|---|---|
| *G09F 11/02* | (2006.01) | |
| *G09F 13/22* | (2006.01) | |
| *G01K 1/024* | (2021.01) | |
| *G01K 3/00* | (2006.01) | |

(52) U.S. Cl.
CPC .......... *G09F 11/02* (2013.01); *G01K 1/024* (2013.01); *G01K 3/005* (2013.01); *G09F 13/22* (2013.01); *G01K 2207/02* (2013.01); *G09F 2013/222* (2013.01)

(58) Field of Classification Search
None
See application file for complete search history.

(56) References Cited

U.S. PATENT DOCUMENTS

| | | | | |
|---|---|---|---|---|
| 4,059,997 A | * | 11/1977 | Trott | G01K 1/04 374/155 |
| 6,101,927 A | * | 8/2000 | Kurmlavage | A47J 37/048 99/342 |
| 8,112,920 B2 | | 2/2012 | Fenton | |
| 8,904,684 B1 | | 12/2014 | Kurmlavage | |
| 2002/0005120 A1 | * | 1/2002 | Kurmlavage | A47J 37/048 99/342 |
| 2010/0000135 A1 | * | 1/2010 | Fenton | G09F 3/20 40/501 |
| 2011/0180438 A1 | * | 7/2011 | Radi | G01K 13/00 206/459.1 |

(Continued)

*Primary Examiner* — David R Dunn
*Assistant Examiner* — Christopher E Veraa

(57) ABSTRACT

A rolling information display apparatus configured to rotate on the rolling surfaces of a roller grill is provided. The apparatus includes a tubular shaped body configured to roll in contact with the rolling surfaces of a roller grill. The apparatus further includes a calibrated cook timer, a temperature monitor, a temperature indicator, and an information medium removably positioned on the tubular shaped body. The calibrated cook timer includes a printed circuit board that is calibrated to rise in temperature in a similar manner to a food item that is cooked on said roller grill. The apparatus is used to display product information, to monitor the temperature of food items in close proximity to the apparatus, and to indicate when the food item is no longer suitable for consumption and sale.

15 Claims, 3 Drawing Sheets

(56) References Cited

U.S. PATENT DOCUMENTS

| | | | |
|---|---|---|---|
| 2012/0299734 A1* | 11/2012 | Holthaus | G01K 1/02 |
| | | | 340/584 |
| 2018/0252592 A1* | 9/2018 | Charoonsophonsak | G06F 9/06 |
| 2018/0353003 A1* | 12/2018 | Sabata | G01K 1/024 |
| 2019/0163852 A1* | 5/2019 | Negoro | A61L 2/04 |
| 2019/0365148 A1* | 12/2019 | Gabriel | A47J 27/004 |
| 2020/0000310 A1* | 1/2020 | Chu | A47L 15/4285 |
| 2020/0129006 A1* | 4/2020 | Nivala | G08B 21/182 |

* cited by examiner

ROLLING INFORMATION DISPLAY APPARATUS INCLUDING A TEMPERATURE MONITOR AND INDICATOR

CROSS-REFERENCE TO RELATED APPLICATIONS

This application claims the benefit of U.S. Provisional Application No. 62/915,994 filed on Oct. 16, 2019, entitled, "Rolling Information Display Apparatus And A Method Of Displaying Product Information On A Roper Grill". The above identified patent application is herein incorporated by reference in its entirety to provide continuity of disclosure.

FIELD OF THE INVENTION

The present invention relates generally to a rolling information display apparatus. More specifically, it pertains to a rolling information display apparatus configured to rotate on the rolling surfaces of a roller grill that includes a temperature monitor, a temperature indicator, and an information medium for use in monitoring of the temperature of items contained on the roller grill.

BACKGROUND OF THE INVENTION

A popular way to display food items at convenience stores and concession stands is to allow the product to both cook and remain warm on roller grill devices. Such roller grills heat the food items and are typically used with hot dogs, sausages, and other retail food items which lend themselves to processing on roller grills given their shapes. Food items are typically placed on the heated rollers which are comprised of roller elements which rotate continuously and cause the food item to roll while absorbing heat from the roller surfaces. In view of regulations and cleanliness required in such retail food environments, such roller grills are made of nonstick materials, chromed or made of other high quality materials specifically suited to both convey heat efficiently and to remain clean and easily kept in the required sanitary condition.

Such roller grills are frequently placed where customers can see the items being offered. Many establishments today label the available food items by using menu options mounted on the wall or the counter in which the retail food items are being offered. It is occasionally not obvious which labeling and pricing of a particular food item relates to which item is actually on a roller grill at any given time as available menu items may change throughout the day.

For requirements of cleanliness, food safety, and isolation of food items from the general public as may be required by some health regulations, such roller grills are encased in glass cases to shield a product to prevent contamination of the food and to prevent customers from accidentally being burned by access to the grill directly. It would be desirable to have information about the food item on the roller grill immediately available and in the same location as the items being offered so there is no confusion as to the name of the item, the composition of the item or other information that consumers would need to know to make a selection. Therefore, having a sign that can be placed next to the rotating food item on the grill would provide clear and more precise information and is more desirable than the methods used today to label food items on the grill.

There have been information display devices which can be placed on a roller grill next to the item being offered. However, those devices found in the prior art are more complicated in their configuration and typically contain labeling information which must be placed in a clear cylinder and for which any information changes or price updates requires disassembling such prior art apparatus and placing new signs therein. Such devices also require constant cleaning so that the glass or clear plastic which seals the cylindrical sign device can be read by a consumer. Having normal cooking greases and oils along with discoloration from the high temperature of a roller grill is a specific disadvantage of such typical roller grill display information devices which has not yet been overcome. Also, with a device which has a larger contact area between it and the roller grill elements, food or other debris such as cooking oils contaminate the device more readily.

Accordingly, there is a need for a rolling information display device as well as a method for displaying product information used with a roller grill that does not require opaque or clear coverings for the product information, rotating with the device, to be read by a customer. Moreover, there is a need to assure quality and food safety during the cooking and serving process, that can alert the operator of unsafe conditions.

DESCRIPTION OF THE PRIOR ART

Various rolling information display devices are known in the prior art. For example, U.S. Pat. No. 8,904,684 B1 to Kurmlavage et al. (hereinafter 'Kurmlavage') discloses a rolling information display apparatus and a method of displaying product information on a roller grill. A circular and symmetrical thimble device is configured to accept replaceable product information displays through the center of the device. The thimble acts as a collar for the product display information sign which is removable to allow for changing product information. The apparatus rolls along with the movement of the roller grill on which products are kept warmed in a typical retail display. The apparatus and the method of display disclosed allow for immediate labeling of products on a retail roller grill along with quick change capability to allow information to be changed in the thimble without the need to open up any apparatus or device.

Similarly, U.S. Pat. No. 8,112,920 B2 (FENTON) discloses a rolling information display apparatus for use with a roller grill that includes an elongated envelope. A cap is removably positioned over at least one opening of the envelope. An information bearing medium is removably positioned inside the envelope. The cylindrical rolling member also has one or more recessed surfaces bearing information about food items offered for sale on the grill. The recessed surfaces are provided in regions of the rolling member that are of a diameter less than regions of the rolling member in which the rolling surfaces are provided.

While these prior art devices disclose rolling information display apparatuses for use with a conventional roller grill, these devices, however, include advertising material that require disassembly when information changes or price updates are required. Additionally, these devices do not include a temperature monitor or a temperature indicator for use in monitoring of the temperature of items contained on the roller grill, or a timer all integrated in a printed circuit board that can be preprogrammed to specific food types.

SUMMARY OF THE INVENTION

The present invention overcomes the limitations inherent with traditional rolling information display devices by providing a new and improved apparatus that allows for the monitoring of the temperature and cook/hold time of items contained on a roller grill or any holding vessel or warming/cooling case. The apparatus includes a tubular shaped body configured to roll in contact with the rolling surfaces of a roller grill. The apparatus further includes a calibrated cook timer, a first end comprising a temperature monitor, a second end comprising a temperature indicator, and an information medium removably positioned on the tubular shaped body. The calibrated cook timer includes a printed circuit board that is calibrated to rise in temperature in a similar manner to a food item that is cooked on said roller grill. The apparatus allows for the monitoring of the temperature of the food items contained on the roller grill, the length of time the items have been offered for sale, the immediate labeling of food products on the grill, oven, vessel, or warming case, and further includes either a permanent outer waterproof non removable sticker or a quick change capability to allow information to be removed and replaced without the need to open the apparatus.

The present invention utilizes a cylindrical configuration having surfaces designed to roll when in contact with the rolling surfaces of a roller grill that is used in retail food point of sale operations. In grilling operations, the device rotates in synchronization with the roller grill and in close proximity to the food items on the grill. A temperature monitor, such a thermometer, indicates the internal temperature of the apparatus. The calibrated cook timer is programed to heat in a manner similar to a food item on the grill. When the interior of the device reaches a predefined temperature, the temperature indicator, preferably an LED on the second side of the device, is activated thereby indicating that the desired temperature has been reached. For advertisement purposes, the device contains an information medium comprising indicia that is removably attached to the tubular shaped body such that information is immediately available and in close proximity to the food items being offered. The entire apparatus is heat resistant to avoid damage by contact or proximity of the rolling heated surfaces of the roller grill.

Additionally, the present invention provides a method of display of product, food information, and food item temperature when used in conjunction with retail food products available on a rolling heated surface, such as those used in conventional roller grills with retail food outlets. The method enables a user to display product information, to monitor the temperature of food items in close proximity to the apparatus, and to indicate when the food item is no longer suitable for consumption and sale.

The present invention substantially diverges from the devices that are known and disclosed in the prior art and consequently it is clear that there is a need in the art for an improvement to rolling information display apparatuses. In this regard the instant invention substantially fulfills these needs.

OBJECTS OF THE INVENTION

In view of the foregoing disadvantages inherent in the known types of rolling information display apparatuses for use with roller grills now present in the prior art, the present invention provides a rolling information display apparatus, wherein the same can be utilized to display product information, to monitor the temperature of food items in close proximity to the apparatus, and to indicate when the food item is no longer suitable for consumption and sale.

It is therefore an object of the present invention to provide a new and improved rolling information display apparatus that has all of the advantages of the prior art and none of the disadvantages.

It is another object of the present invention to provide a rolling information display apparatus for use with roller grills that are known and used in the art.

Another object of the present invention is to provide a rolling information display apparatus that includes a tubular shaped body comprising a watertight compartment comprising a printed circuit board, a programmable calibrated thermometer, a programmable calibrated timer, a high heat long life replaceable battery.

Yet another object of the present invention is to provide a rolling information display apparatus that includes an information medium removably positioned on the surface of the tubular shaped body.

Another object of the present invention is to provide a rolling information display apparatus comprising a surface configured to roll in contact with the rolling surfaces of a roller grill.

A final object of the present invention is to provide a rolling information display apparatus that displays product information, monitors the temperature of food items in close proximity to the apparatus, and indicates when the food item is no longer suitable for consumption and sale.

Other objects, features and advantages of the present invention will become apparent from the following detailed description.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
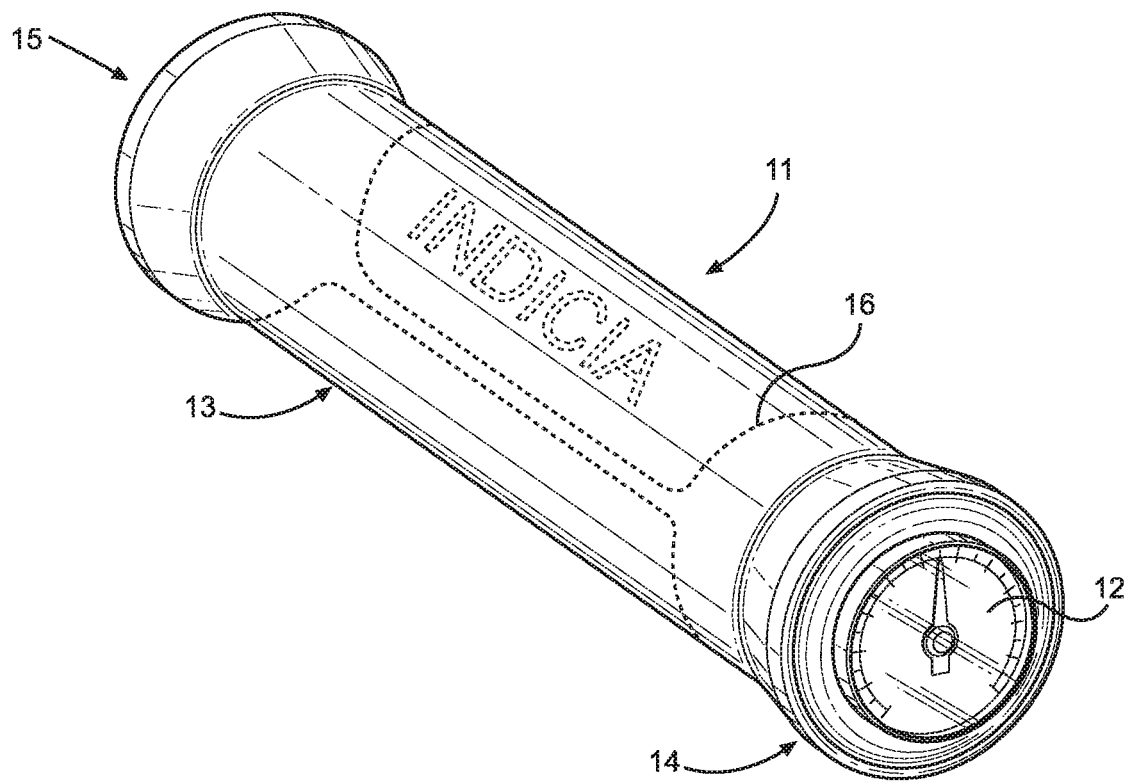
FIG. 1 shows a view of the temperature monitor on the first end of the rolling information display apparatus.

Reference is made herein to the attached drawings. Like reference numerals are used throughout the drawings to depict like or similar elements of the rolling information display apparatus. For the purposes of presenting a brief and clear description of the present invention, the preferred embodiment will be discussed as used for a rolling information display apparatus to display product information, to monitor the temperature of food items in close proximity to the apparatus, and to indicate when the food item is no longer suitable for consumption and sale. The figures are intended for representative purposes only and should not be considered to be limiting in any respect.

Referring now to FIG. 1, there is shown a view of the temperature monitor 12 on the first end 14 of the rolling information display apparatus 11. The apparatus includes a tubular shaped body 13 comprising a calibrated cook timer, a first end 14, and a second end 15. The rolling information display apparatus 11 further includes an information medium 16 removably positioned on the tubular shaped body 13, a temperature monitor 12 on the first end 14, and a temperature indicator (shown in more detail below) on the second end 15 that alerts a user that the apparatus 11 has reached a predefined temperature. In a first embodiment as shown, the temperature monitor 12 comprises an analogue thermometer. The analogue thermometer functions as a standard cooking thermometer that is well understood in the art. The thermometer utilizes a temperature probe positioned inside the tubular shaped body 13 that monitors the temperature of the calibrated cook timer contained therein. In a second embodiment, the temperature monitor 12 comprises a digital thermometer for monitoring the temperature of the calibrated cook timer.

The calibrated food simulating cook timer is contained within the tubular shaped body 13 and is attached to the temperature monitor 12. In the preferred embodiment, the calibrated cook timer is a printed circuit board that is calibrated to rise in temperature in a similar manner to a specific item that is typically cooked on a roller grill, which is described in greater detail below. As a non-limiting example, when the rolling information display apparatus 11 is placed on a roller grill next to a batch of cold food items, such as hotdogs, sausages, egg roll, breakfast items, or the like, the calibrated cook timer is programed to rise or fall at the identical temperature and at the same rate as the cold food items. Once the predetermined internal temperature of the apparatus 11 is reached, which is monitored via the temperature monitor 12, the indicator (described below) on the apparatus 11 is activated.

Figure 2:
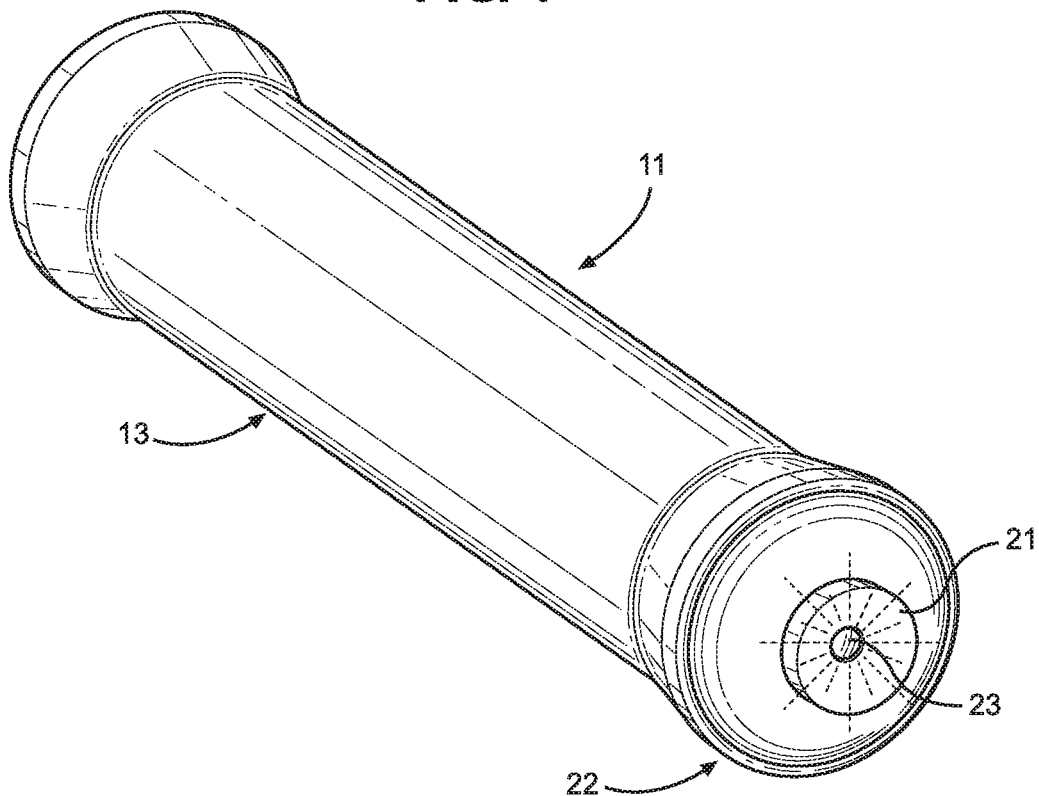
FIG. 2 shows a view of the temperature indicator on the second end of the rolling information display apparatus.

Referring now to FIG. 2, there is shown a view of the temperature indicator 21 on the second end 22 of the rolling information display apparatus 11. As shown here, the information medium has been removed from the apparatus 11. The second end 22 of the rolling information display apparatus 11 includes a temperature indicator 21 that alerts a user that the simulated protein within the tubular shaped body 13 has reached a desired temperature. In the preferred embodiment, the indicator 21 is a battery operated, waterproof LED 23. Preferably, the LED 23 includes a color mode that indicates a particular mode for the apparatus 11. In a non-limiting example, in a first mode, the LED 23 is yellow, which indicates to the user that the apparatus 11 is functioning and monitoring the temperature of the calibrated cook timer. In a second mode, the LED 23 is green, which indicates to the user that the desired temperature has been reached. In a third mode, the LED 23 is red, which indicates to the user that a predefined amount of time has expired and the associated food product is no longer fit for sale or consumption.

In one non-limiting example, the apparatus 11 is placed on the roller grill at the same time as a food product, such as a hotdog. The LED 23 flashes yellow, to indicate that the apparatus 11 and therefore the food product have not reached the desired temperature. The LED 23 flashes green when the desired temperature is reached, indicating that the food product has reached the desired temperature. The green color also signals the activation of a timer, such as a four hour hold timer. After the four hour hold timer has expired, the LED 23 flashes red, indicating that the product has reached the end of its sell time and should be discarded. An audible alert can also be included within the device.

Figure 3:
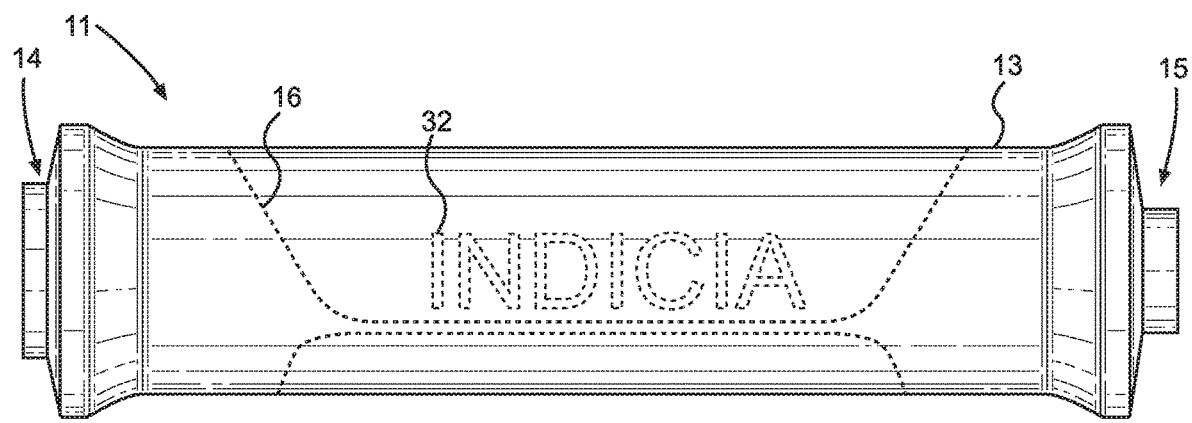
FIG. 3 shows a side view of the information medium positioned on the surface of the tubular shaped body.

Referring now to FIG. 3, there is shown a side view of the information medium 16 positioned on the surface of the tubular shaped body 13. The apparatus 11 includes a tubular shaped body 13 with increased diameter at the first end 14 and the second end 15. The tubular shaped body 13 preferably includes an information medium 16 that removably attaches thereto. The information medium 16 can include indicia 32 thereon in the form of advertisement displays, product sign information, and the like. In one embodiment, the information medium 16 matches the contours thereof and snaps into position around the tubular shaped body 13. As can be appreciated, the information medium 16 can be removed and replaced with different indicia 32 as desired. The changing, refreshing, or updating of the information medium 16 can be accomplished by simply attaching a new or different information medium 16 without the need to open a container, open seals, unscrew containers, clean any clear or visible protective surfaces or other actions, which are presently found in other roller label devices that may be seen in the industry.

Figure 4:
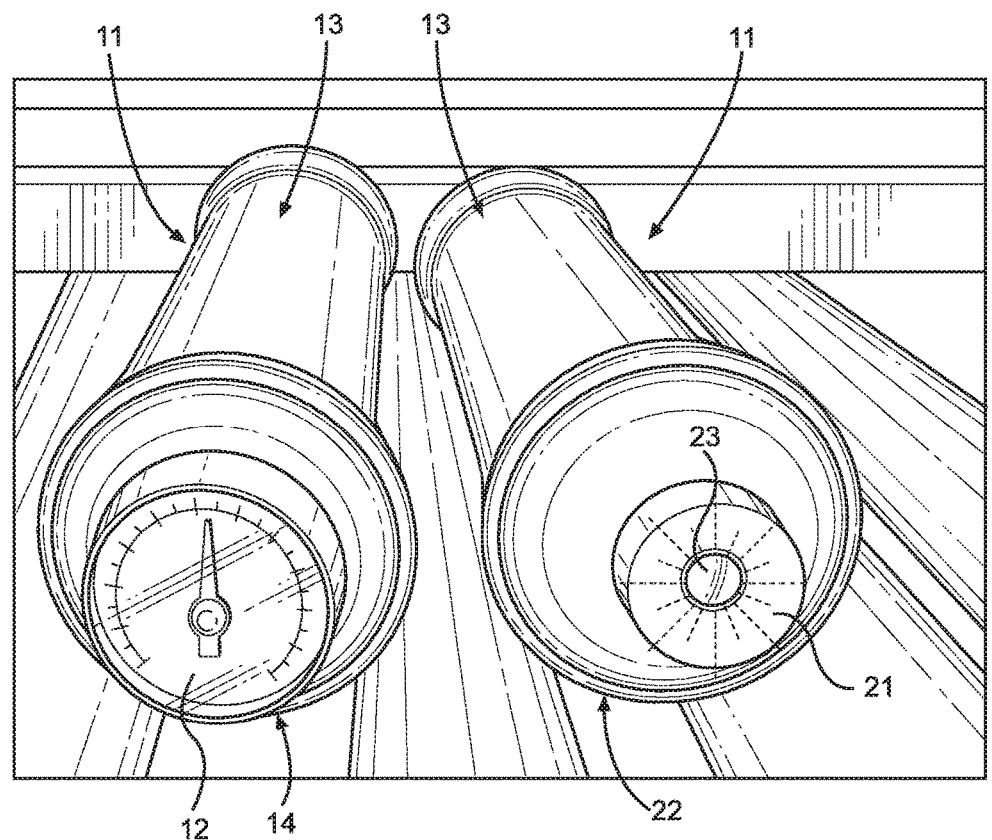
FIG. 4 shows a view of the temperature monitor on the first end and a view of the temperature indicator on the second end of the rolling information display apparatus.

Referring now to FIG. 4, there is shown a view of the temperature monitor 12 on the first end 14 and a view of the temperature indicator 21 on the second end 22 of the rolling information display apparatus 11. Contained within the tubular shaped body 13 is a calibrated cook timer that simulates the cooking of a protein on a roller grill. In the preferred embodiment, the calibrated cook timer comprises a printed circuit board that is calibrated to rise in temperature in a similar manner to a specific item that is typically cooked on a roller grill. The printed circuit board is calibrated with one or more curves or programs that mimics the rise in temperature of various roller grill items, such as hot dogs, sausages, and the like. This curve enables the device to indicate, via the temperature monitor 12, the same or a similar temperature as that of the roller grill item. As can be appreciated, the conventional method for determining the temperature of an item on a roller grill is with a thermometer that is placed within the food product. The insertion of the thermometer causes the food product to become unaesthetic and unappealing to consumers, which often results in the item being discarded. By utilizing the apparatus of the present invention, there is no longer a need to insert a thermometer into a food product to ascertain its internal temperature.

The apparatus 11 can be programmed with protein calibrated software for various types of food items. The software allows the user to select from a list of predefined curves for common food items (hot dogs, sausages, etc.). Additionally, the user can program the apparatus 11 with a customized curve based on a desired interior temperature for non-traditional items or for specific needs. Furthermore, the indicator lights can be programmed with different modes, such as where the LED 23 changes from green to red in a specified time. Audible indicators can also be programmed to alert a user of the change from one mode to another, such as when the desired temperature is reached, when the hold time is reached, or when the battery is running low. The programming may be accomplished via customized software on a computer or with a smartphone application. The device can be connected to a programming device via a wired attachment to a computer or smartphone, or alternatively, via a wireless connection, such as WiFi, NFC, Bluetooth, and the like. Additionally, a smartphone application can monitor the temperature of the item, and a notification can be sent to the phone to alert the operator of the temperature and hold time remaining for the food products.

The smartphone can receive data associated with the various modes of the temperature indicator.

Figure 5:
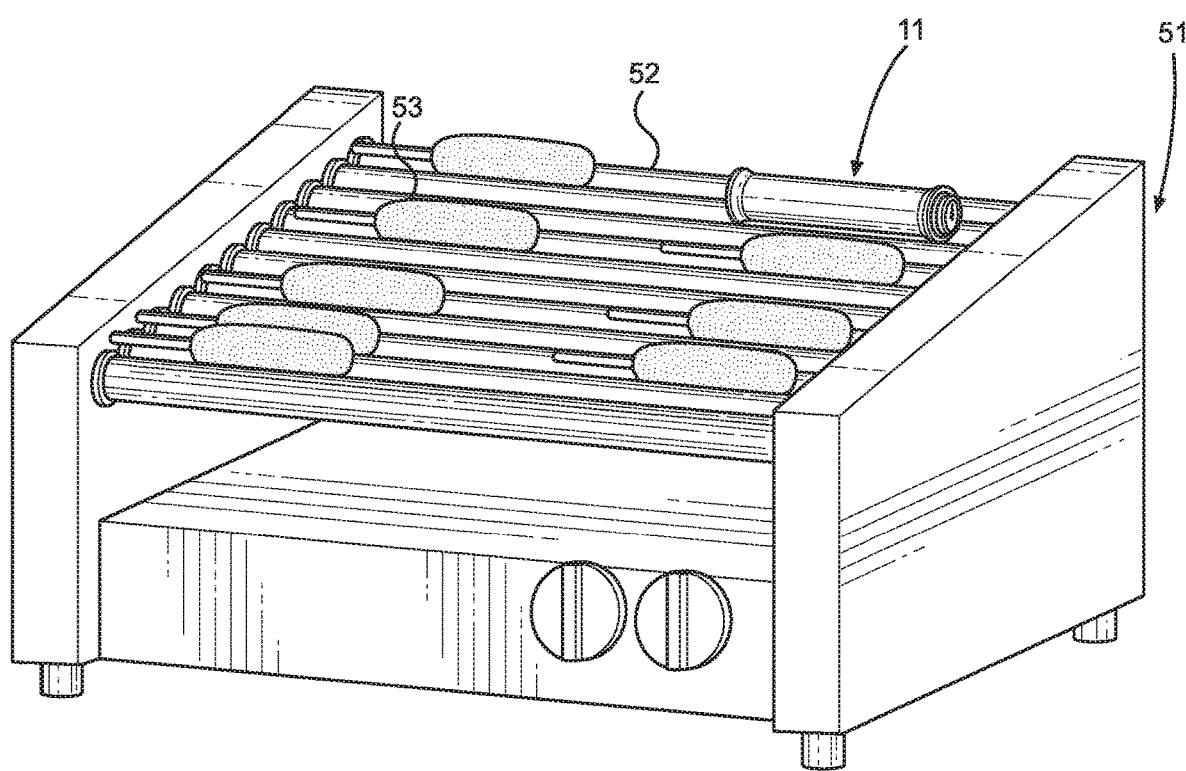
FIG. 5 shows a view of the rolling information display apparatus positioned on the rolling surface of a roller grill.

Referring now to FIG. 5, there is shown a view of the rolling information display apparatus 11 positioned on the rolling surface 52 of a roller grill 51. The entire apparatus 11 is preferably constructed of a dishwasher safe, heat resistant material. The apparatus 11 is also constructed from materials that prevent the roller grill surface 52 from being damaged. In grilling operations, the apparatus 11 rotates in synchronization with the rolling surface 52 of the roller grill 51 in close proximity to the food items 53 on the grill 51, which are also rotating with the grill 51 and are available for sale. The food items 53 are placed on the grill 51 at the same time as the apparatus 11, the desired calibration curve is selected, and the apparatus 11 is activated, and the LED flashes yellow. When the temperature as defined by the calibration curve is reached, the LED flashes green, which also begins the countdown or hold timer. After the hold timer has expired, the LED flashes red, indicating that the food items 53 have reached the end of their sell time and should be discarded. The process can be repeated on a continuous cycle as desired by the user.

In an alternate embodiment, in addition to use on a roller grill, the apparatus is designed for immersion in a cooking vessel, such as in a pot of sauce, macaroni and cheese, or soup, within an oven, or in a warming case. The device includes a hyperbolic shaped body that is waterproof, and contains the calibrated cook timer. In this embodiment, the temperature monitor and temperature indicator are integrated into the printed circuit board within the tubular shaped body. The various modes are calibrated and programmed through a series of coded blink frequencies and coded blink colors. The timer and monitor are all integrated in the printed circuit board that can be preprogrammed to specific food types. The apparatus is calibrated to match the cooking and holding time that the actual food item will undergo on the actual cooking or warming case. The entire process is calibrated to simulate the food item, in a matter that is similar to artificial intelligence for food items.

The printed circuit board is programed with artificial intelligence to simulate a food item. Integrated onto the printed circuit board is the timer and thermometer that operates under the same time and temperature as the food item. A signaling indicator, such as Bluetooth, WiFi, or a flashing LED signals the operator or consumer that the cook/hold/serve process is either within specification or needs attention. A sealed cap at first end, and a second end.

Overall, the present invention provides a new and improved apparatus for monitoring temperature of food items on a roller grill. The device affords a simple solution for determining the temperature of items as they cook on a roller grill, the amount of time the items can be offered for sale, and a means of displaying information associated with the food items. Use of the present invention takes the guesswork out of determining whether a food item has reached the proper temperature, how long the item has been available for sale, and when the item is no longer suitable for consumption. Additionally, the device provides a simple means for advertising information associated with the food item, such as type, price, and the like. The information medium can be quickly removed and replaced as required. This in turn provides a cost effective and simple solution to increase food safety for consumers.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A rolling information display apparatus configured to rotate on the rolling surfaces of a roller grill, said apparatus comprising:
   a tubular shaped body comprising a calibrated cook timer, a first end comprising
      a temperature monitor, a second end comprising a temperature indicator, and an information medium removably positioned on said tubular shaped body.

2. The apparatus of claim 1, wherein said calibrated cook timer comprises a printed circuit board.

3. The apparatus of claim 2, wherein said printed circuit board enables said apparatus to indicate, via said temperature monitor, the temperature of said one or more food items that are cooked on said roller grill.

4. The apparatus of claim 2, wherein said printed circuit board is programmed with software via a computer or smartphone.

5. The apparatus of claim 1, wherein said temperature monitor comprises a thermometer.

6. The apparatus of claim 1, wherein said temperature indicator comprises a battery operated, waterproof LED.

7. The apparatus of claim 6, wherein said temperature indicator LED comprises a color mode that indicates a particular mode for the apparatus.

8. The apparatus of claim 7, wherein said temperature indicator LED comprises a first mode, which indicates that the apparatus is functioning and monitoring the temperature of the cook timer; a second mode, which indicates that the desired temperature has been reached; and a third mode, which indicates that a predefined amount of time has expired and said one or more food items is no longer fit for sale or consumption.

9. The apparatus of claim 8, wherein said first mode comprises a flashing green LED; said second mode comprises a flashing yellow LED; and said third mode comprises a flashing red LED.

10. The apparatus of claim 8, wherein said temperature indicator comprises an audible indicator to indicate the change from one mode to another.

11. The apparatus of claim 8, wherein said first mode, said second mode, or said third mode information are communicated to a smartphone via a notification.

12. The apparatus of claim 1, wherein said information medium matches the contours thereof and snaps into position around said tubular shaped body and further comprises indicia thereon in the form of advertisement displays or product sign information.

13. A rolling information display apparatus configured to rotate on the rolling surfaces of a roller grill, said apparatus comprising:
   a tubular shaped body comprising a calibrated cook timer, a first end comprising
      a temperature monitor, a second end comprising a temperature indicator, and an information medium removably positioned on said tubular shaped body;
   wherein said cook timer comprises a printed circuit board;
   wherein said temperature monitor comprises a thermometer;
   wherein said temperature indicator comprises a battery operated, waterproof LED;
   wherein said temperature indicator LED comprises a first mode, which indicates that the apparatus is functioning and monitoring the temperature of the cook timer; a second mode, which indicates that the desired temperature has been reached; and a third mode, which indicates that a predefined amount of time has expired and said one or more food items is no longer fit for sale or consumption; and wherein said information medium matches the contours of and snaps into position around said tubular shaped body and further comprises indicia thereon in the form of advertisement displays or product sign information.

14. The apparatus of claim 13, wherein said first mode comprises a flashing green LED; said second mode comprises a flashing yellow LED; and said third mode comprises a flashing red LED.

15. The apparatus of claim 13, wherein said first mode, said second mode, or said third mode information are communicated to a smartphone via a notification.

* * * * *